Sept. 22, 1925.
A. V. VERVILLE
AIRPLANE TRUSS
Filed April 18, 1922
1,554,243
3 Sheets-Sheet 1
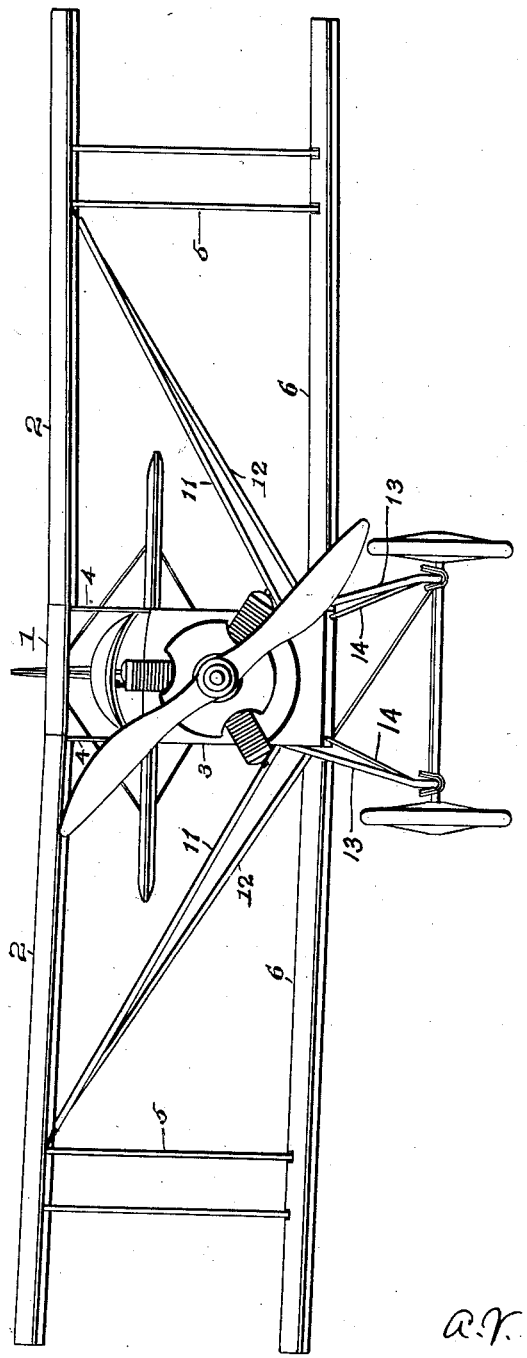
Inventor
A. V. Verville
By Robert H. Young
Attorney Sept. 22, 1925. 1,554,243
A. V. VERVILLE
AIRPLANE TRUSS
Filed April 18, 1922 3 Sheets-Sheet 2
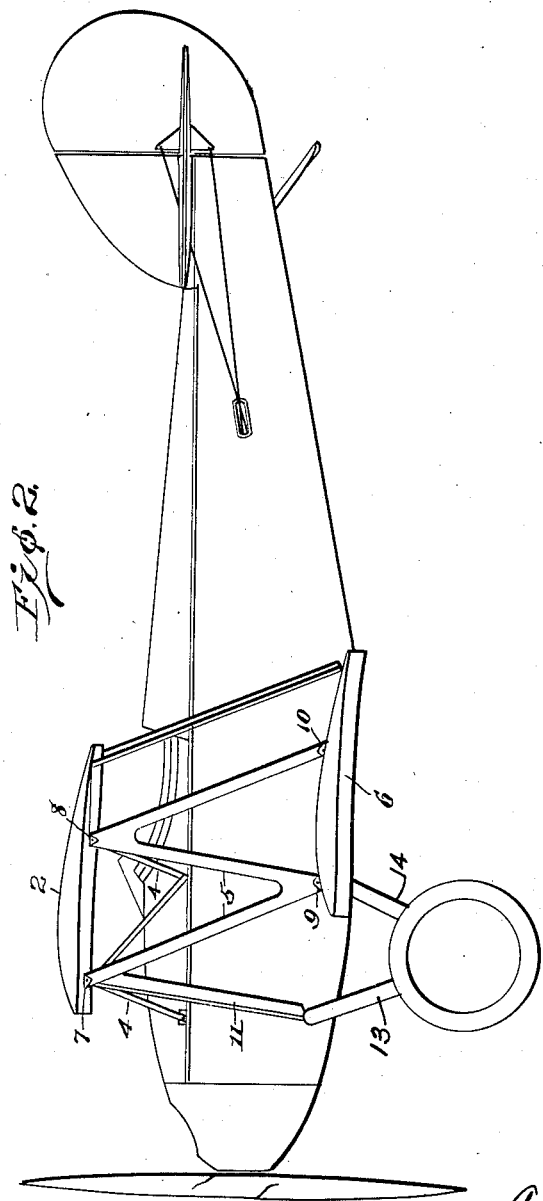

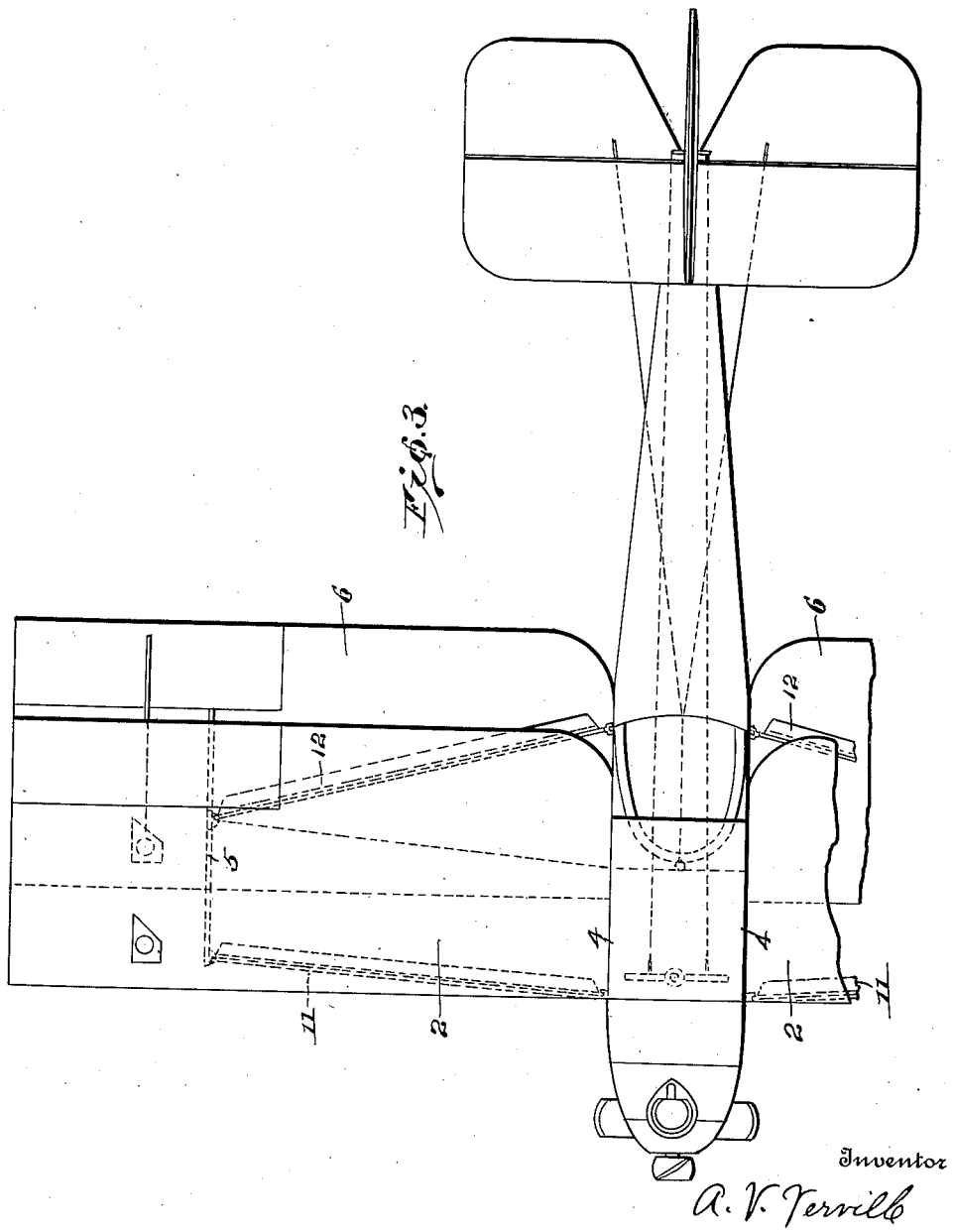

Patented Sept. 22, 1925.

1,554,243

UNITED STATES PATENT OFFICE.

ALFRED V. VERVILLE, OF DAYTON, OHIO.

AIRPLANE TRUSS.

Application filed April 18, 1922. Serial No. 555,305.

*To all whom it may concern:*

Be it known that I, ALFRED V. VERVILLE, a citizen of the United States, residing at Dayton, in the county of Montgomery and State of Ohio, have invented certain new and useful Improvements in Airplane Trusses, of which the following is a specification.

This invention relates to airplane trussing means the same being particularly adapted to biplane structures or airplane structures embodying two or more superposed lifting planes or wings.

The objects of the invention are to eliminate much of the parasitic resistance now due to the presence of struts and truss wires and correspondingly improve the performance of the craft; to eliminate an appreciable number of strut and wire fittings now used; to simplify taking down and assembling an airplane in the field and reducing the time now required; to enable a new truss member to be quickly and easily removed and a new one substituted therefor without adjustments; and to enable the angle of incidence of the wings to be easily changed on the field to suit any pilot.

With the above and other objects in view, the invention consists in the novel construction, combination and arrangement herein fully described, illustrated and claimed.

In the accompanying drawings:

Figure 1 is a front elevation of a biplane showing the improved trussing;
Figure 2 is a side elevation of the same; and Figure 3 is a plan view thereof.

In the drawings I have illustrated the improved truss features applied to a biplane which has been especially designed for war and commercial purposes and designated a messenger airplane, the same being intended to be used as an aerial motorcycle. The airplane shown is of small size, light weight and light power and yet, owing to the improved truss, has been unusually sturdy in operation and reliable in performance.

In carrying out the invention the upper supporting plane embodies a center section 1 and wing sections 2 detachably secured thereto. The center section 1 is placed above and in spaced relation to the fuselage 3 and rigidly connected to the latter by N struts 4. Each of said struts is a one piece structure and consists of three members, two substantially parallel or extending in the same general direction, and a third connecting said two members at or adjacent to opposite ends thereof thereby forming substantially the letter N.

Interplane struts 5 also of N formation but larger in size connect the upper plane to the wings 6 of the lower supporting plane. It is to be noted that each strut 5 has two attaching points 7 and 8 to connect to the main leading and trailing spars of the upper plane, and also has two lower attaching points 9 and 10 to connect to the main leading and trailing spars of the lower plane. The angles of inclination, if any, of the front and rear members of the strut depend upon the stagger of the upper and lower planes. In the drawings the upper plane is shown as having a considerable forward overhang, hence the front and rear members of the struts 5 have considerable inclination. The third or intermediate member of the strut is reversely inclined and rigidly connects the front and rear members at or adjacent to opposite ends thereof. Each strut 5 is one rigid unit as is also each strut 4. Only four attaching clips or fittings are used in connection with each strut and in some cases such fittings are also used to fasten other bracing and coupling members.

Front and rear truss members 11 and 12 respectively extend between the points of junction of the struts 5 and upper wings 2 and the fuselage 3. Each front truss member 11 is conveniently secured at its outer and upper end to the fittings which attaches to point 7 of the adjacent strut 5 to the upper plane. At its inner lower end said truss member 11 is connected by a fitting to the bottom longéron on the adjacent side of the fuselage at a point in advance of the leading edge of the lower wing 6 and further forward than the point of attachment of the outer end of the truss member.

Each rear truss member 12 is fastened conveniently at its outer upper end to the fitting which attaches the upper wing 2 to the point 8 of the strut 5. The inner lower end of said truss member 12 is secured by a fitting to the bottom longéron at that side of the fuselage at a point substantially in the vertical line of the trailing edge of the upper wing 2. Thus, as shown in Fig. 3, the truss members 11 and 12 diverge and effectively act as both tension and compression members to counteract the flying and landing stresses and also the drift stresses on the wings.

By observing the drawings and in particular, Fig. 2, it will be noted that the wing truss is securely tied up with the landing gear truss. The forward truss member 11 of the wing truss is connected to the lower longéron of the fuselage at the same point at which the forward member 13 of the landing gear truss also joins the fuselage. Each rear member 14 of the landing gear truss is connected to the fuselage substantially at a point where the fuselage is joined to the lower wing, which point is slightly to the rear of the leading edge of the wing. Directly above this junction and also directly above the junction of the strut 13 and strut 11 are two points on the fuselage which are connected by the N-truss 4 to the upper wing beams. The arrangement just described of the N-truss 4, the wing truss and the landing gear truss is of course duplicated on both sides of the machine.

By reason of the truss system herein described and shown a very considerable amount of parasitic resistance is eliminated and the performance of the airplane proportionately improved. Some of the usual fittings and their resistance are also eliminated. A structure of increased strength and rigidity is also obtained and one which is capable of being assembled in the field with a minimum amount of work and time. A broken strut may be easily replaced since it is only necessary to remove and replace a few pins. The angle of incidence of the wings may also be easily changed to suit any particular pilot by changing the lengths of the truss members 11 and 12 which is accomplished by turning the end fittings of said truss members, said fittings having a screw threaded connection therewith. It is to be noted that all flying wires, landing wires and drift wires are eliminated.

What I claim is:

1. In an airplane, a fuselage, upper and lower supporting planes projecting on opposite sides of the fuselage, and arranged in staggered formation, interplane struts in spaced relation to opposite sides of the fuselage, and tension and compression truss members extending from the junction of said struts with the upper plane inwardly and downwardly to the lower part of the fuselage, one of said truss members being attached to the fuselage at a point in advance of the leading edge of the lower plane.

2. In an airplane, a fuselage, upper and lower supporting planes of substantially equal lateral extent projecting on opposite sides of the fuselage, parallel interplane struts in spaced relation to opposite sides of the fuselage, and rigid tension and compression truss members extending from the junction of said struts with the upper plane inwardly and downwardly to the lower part of the fuselage, the inner ends of said truss members being spaced at a greater distance apart than the outer ends thereof, one of said truss members being attached to the fuselage at a point in advance of the leading edge of the lower plane.

3. In an airplane, a fuselage, upper and lower supporting planes projecting on opposite sides of the fuselage, and arranged in forwardly staggered formation, rigid interplane struts in spaced relation to opposite sides of the fuselage, and rigid tension and compression truss members extending from the junction of said struts with the upper plane divergently inwardly and downwardly to the lower part of the fuselage, the forward truss member on each side of the fuselage having its inner end fastened to the fuselage in advance of the leading edge of the lower plane.

4. In an airplane, a fuselage, staggered upper and lower supporting planes projecting on opposite sides of the fuselage, a single rigid N-shaped strut having two parallel legs arranged at each side of the fuselage and spaced therefrom, and two rigid truss members extending divergently, downwardly and inwardly from the junction of the parallel legs of said struts with the upper plane, to the fuselage, one of said truss members at each side of the fuselage being extensible and contractible in length to enable the angle of incidence of the machine to be changed.

5. In an airplane, a fuselage, upper and lower supporting planes projecting on opposite sides of the fuselage, and arranged in staggered formation, interplane struts in spaced relation to opposite sides of the fuselage, and tension and compression truss members extending from the junction of said struts with the upper plane inwardly and downwardly to the lower part of the fuselage, one of the truss members on each side of the fuselage having its inner end fastened to the fuselage approximately on a vertical line with the trailing edge of the upper plane.

6. In an airplane, a fuselage, upper and lower supporting planes projecting on opposite sides of the fuselage in staggered relation, a substantially vertical N-shaped interplane strut arranged on each side of the fuselage near the outer ends of the planes, and two rigid truss members on each side of the fuselage extending from the junctions of the said struts with the upper plane divergently, inwardly and downwardly to the lower part of the fuselage, one of the strut members on each side of the fuselage having its inner end fastened to the fuselage approximately on a vertical line with the trailing edge of the upper plane and the remaining truss members being fastened to the fuselage at points in advance of the leading edge of the lower plane.

7. In an airplane, a fuselage, upper and lower supporting planes projecting to opposite sides of the fuselage, interplane struts in spaced relation to opposite sides of the fuselage, a plurality of rigid truss members on each side of the fuselage extending from the junction of said struts with the upper plane inwardly and downwardly to the lower part of the fuselage, one of said truss members being attached to the fuselage at a point in advance of the leading edge of the lower plane.

8. An airplane as set forth in claim 7, together with a landing gear truss having forward and rearward stress members, one of said forward stress members, one of said truss members and the fuselage meeting at a common intersection.

9. In an airplane, a fuselage, upper and lower supporting planes projecting to opposite sides of the fuselage and arranged in staggered formation, interplane struts in spaced relation to opposite sides of the fuselage, a plurality of rigid truss members on each side of the fuselage extending from the junction of said struts with the upper plane inwardly and downwardly to the lower part of the fuselage, one of said truss members being attached to the fuselage at a point in advance of the leading edge of the lower plane, a landing gear truss having forward and rearward stress members, one of said forward stress members, one of said truss members, and the fuselage meeting at a common intersection, and said rear stress members of the landing gear truss intersecting the fuselage in a transverse line slightly to the rear of the leading edge of the lower plane.

10. An airplane as set forth in claim 9, said interplane struts being of N formation attached to the upper plane at a plurality of points from which the rigid truss members extend.

11. An airplane as set forth in claim 9, said upper plane being braced above the fuselage and braced thereto by a plurality of N-shaped braces, each brace being attached to the fuselage at points above said first-mentioned common point and said intersection.

12. An airplane as set forth in claim 1, there being two tension and compression truss members arranged in pairs on each side of the fuselage, the upper ends of each pair being spaced apart, and a landing gear truss comprising forward and rear stress members, one of said forward stress members being attached to the fuselage at said mentioned point.

In testimony whereof I affix my signature.

ALFRED V. VERVILLE.